March 17, 1959　　A. E. R. ARNOT　　2,877,913
APPARATUS FOR MANIPULATING AIRCRAFT
Filed March 7, 1956　　3 Sheets-Sheet 2

March 17, 1959

A. E. R. ARNOT 2,877,913

APPARATUS FOR MANIPULATING AIRCRAFT

Filed March 7, 1956

2,877,913
Patented Mar. 17, 1959

2,877,913
APPARATUS FOR MANIPULATING AIRCRAFT

Alfred Erwin Reginald Arnot, Basingstoke, England, assignor to John Reginald Sharp and Emmanuel Kaye, Basingstoke, England Application March 7, 1956, Serial No. 570,007

Claims priority, application Great Britain March 9, 1955

6 Claims. (Cl. 214—332)

This invention comprises improvements in or relating to apparatus for manipulating aircraft on the ground.

It has been proposed to provide, for manoeuvring an aircraft on the ground, a low trolley having a steering and driving wheel at the rear end, lateral ground wheels at the front end and, between the lateral ground wheels, means to engage the undercarriage steering wheel, comprising a horizontal ring which is provided with a seating for the wheel, a bracket on the trolley to engage the ring in such a way that the ring can rotate in the bracket and means on the trolley to lift the bracket and ring, with the wheel, clear of the ground. This obviates the necessity of the stem of the aircraft undercarriage effecting any twisting movement if the trolley is caused to move angularly relatively to the aircraft which it supports. One of the objections to such known construction, however, is that the ring must, in use, be placed around the aircraft wheel before it has been engaged with the bracket on the trolley and it is a difficult object to pick up after being so placed and to lift on to the bracket. Therefore it is difficult to get the parts assembled in operative relation to the aircraft. Furthermore, it has hitherto been the case that the aircraft wheel is not positively secured to the trolley but rested there by its own weight, the ring being free to lift out of its mounting on the trolley. It is an object of the present invention to overcome these difficulties.

According to the present invention a ring for the purpose described is provided with a circumferential flange or flanges which provide bearing surfaces for support by the trolley, and the trolley comprises gripper arms located between the lateral ground wheels, means to lift the gripper arms relatively to the trolley wheels, and on the gripper arms means to engage the bearing flanges on the ring but to permit the ring to rotate relatively to the arms when so engaged.

In a preferred construction the means on the gripper arms to engage the bearing flanges on the ring consists of a split outer ring, having on its inner surfaces anti-friction bearing members to engage the ring, the two halves of the split ring being attached, one to one of the gripper arms and the other to the other gripper arm.

According to a further feature of the present invention the ring is provided with an external flange or groove adapted to be engaged by supporting members on the trolley at a plurality of opposed points in such manner as to prevent both upward and downward movements of the ring relatively to the trolley. Preferably the supporting members take the form of rollers.

The following is a description by way of example of one construction in accordance with the invention.

Figure 1:
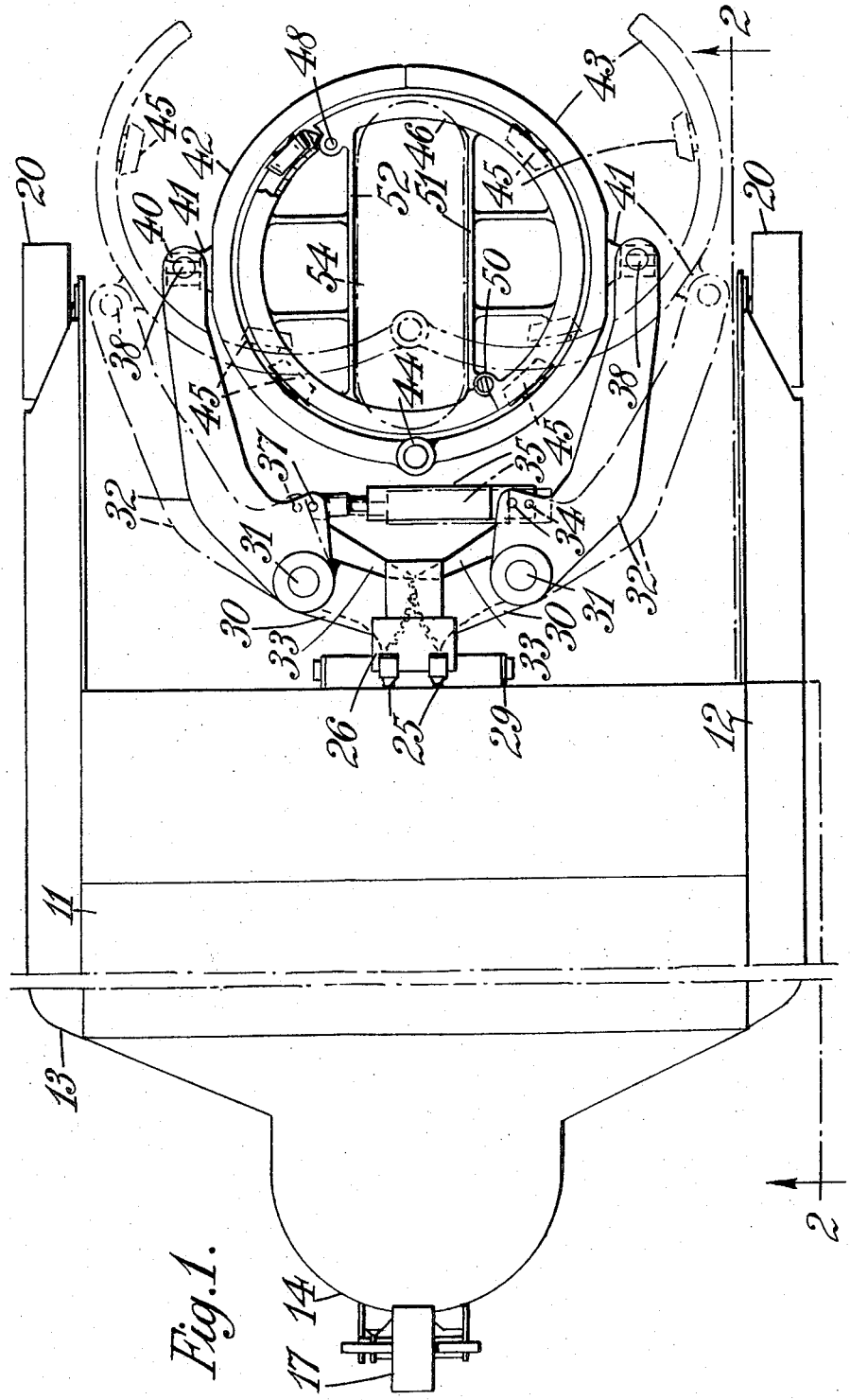
Figure 1 is a plan of the trolley.

A trolley is provided comprising a chassis having a transverse rear portion 11 and two box-shaped forwardly projecting arms 12, 13, one from each side of the back frame 11. In the centre of the back frame is an elevated portion 14 beneath which is a turntable carrying a steering wheel 15 driven by an electric motor 16. The wheel 15 therefore acts both to propel the trolley and to steer it. It is steered by a tiller arm 17 which is hinged to a bracket 19 projecting from the turntable, by the pivot 18. Each of the side arms 12, 13 of the chassis carries at its front end a fixed stub axle and a ground wheel 20.

Figure 2:
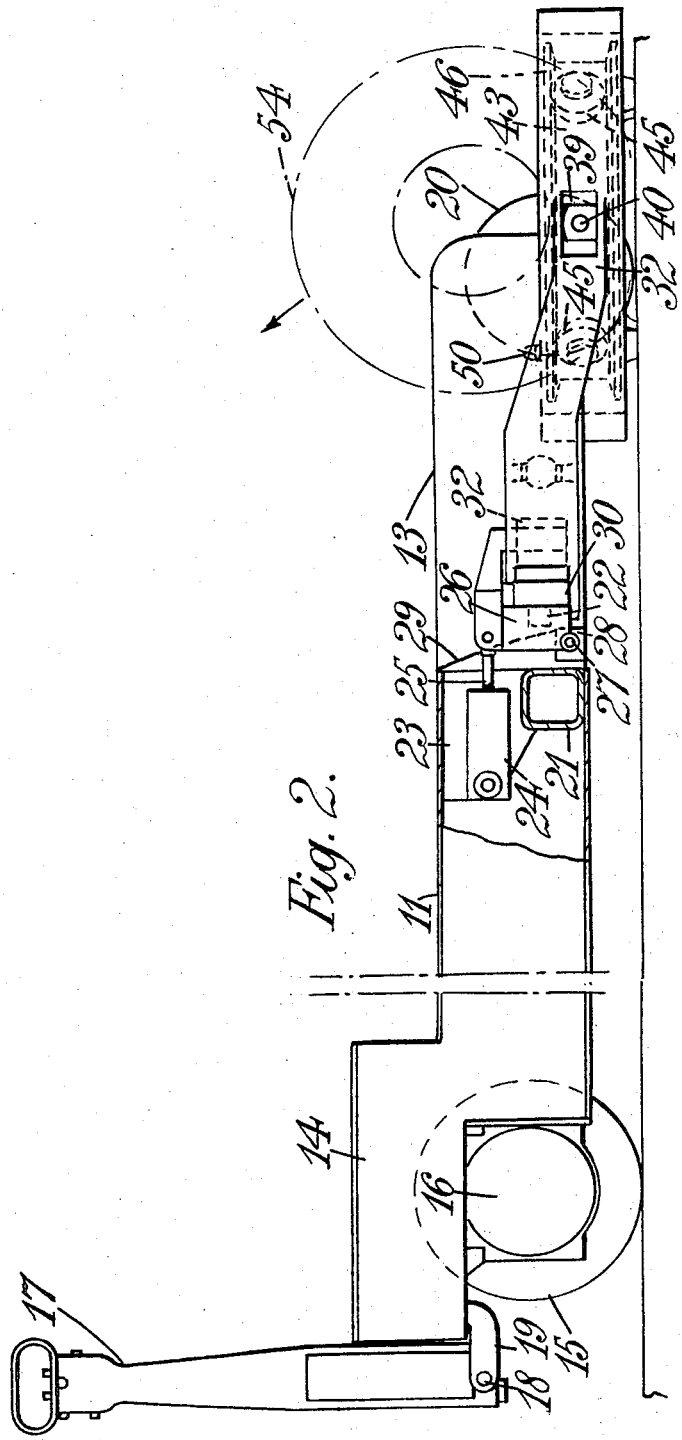
Figure 2 is a side elevation thereof.

In Figure 2 of the drawing the nearer side arm 12 is broken away to show the construction between the side arms. This comprises a tubular cross-member 21 which is united at intervals to the transverse part of the chassis by vertical webs 23. The webs 23 support a pair of cylinders 24 having rams 25 engaged with a tiltable block 26 which is welded to a tubular shaft 27 pivoted in bearings 28 between plate webs 29 which project forwardly from the tubular cross-member 21. The effect is that the cylinders 24 and rams 25 are able, if hydraulic pressure is applied in them by appropriate means not shown, to tilt the block 26 about the axis 27. Pivotally mounted at 22 in the block 26 is a yoke provided with two arms 30 which project forwardly and spread apart from one another and carry pivots 31 for two pivoted gripper arms 32. The gripper arms 32 carry plate-members 33 having toothed edges which mesh together and compel the two arms to move inward or outward about the pivots 31 to the same extent as one another. Secured to a pivot 34 on one of the gripper arms is an operating cylinder 35 containing a ram 36 which is pivoted at 37 to the other arm. By applying hydraulic pressure to this cylinder at one end or the other (it is double acting) the gripper arms 32 can be opened out or closed together.

The gripper arms project forwardly from the pivots 31 and at their front ends they carry pivots 38 on which are mounted blocks 39 containing horizontal stems 40. On the stems 40 there are secured heads 41 (Figure 1) which are rigidly connected to two half rings 42, 43, shown best in the plan Figure 1. The half rings 43 are pivoted together as shown at 44 at their rear side where they are nearest to the cylinder 35 but they merely abut upon one another at the other side, where they are in front of the trolley.

Figure 3:
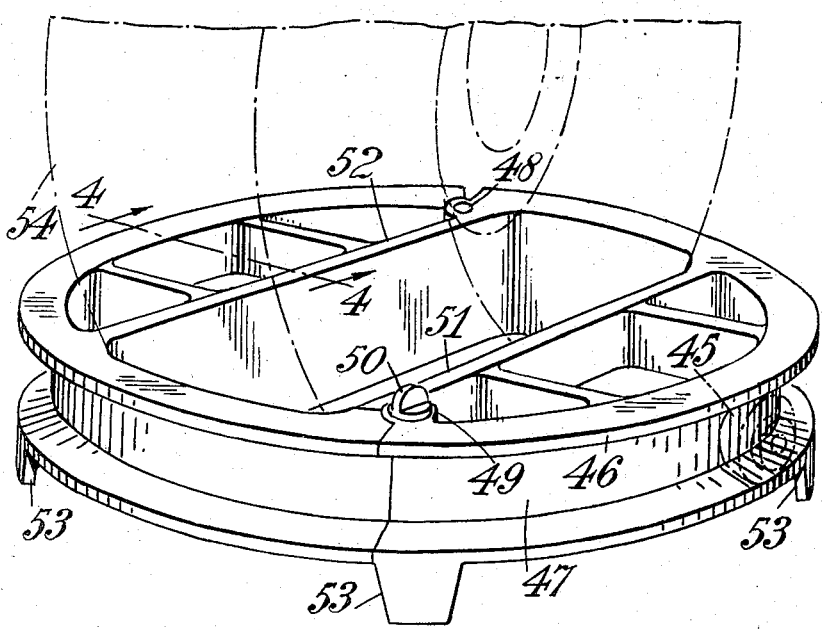
Figure 3 is a perspective view of a ring with an aircraft wheel mounted therein.

As shown in chain line in Figure 1 if the gripper arms 32 are moved outwardly by the jack cylinder 35, the two halves of the ring 42, 43 open out like a pair of jaws. Each half ring carries two conical rollers 45 so that when the rings are closed together as shown in full lines in Figure 1 the four rollers 45 are all directed radially toward the centre of the ring. The four conical rollers 45 run in a channel-shaped groove formed in the exterior of an inner ring 46. The ring 46 is shown in greater detail in Figure 3 of the drawing in which the channel-shaped external groove 47 can be seen and in which one of the rollers 45 is indicated in chain line in its position in the groove.

The ring 46 is formed in two halves which are hinged together at 48 on one side and at the other side carry ears 49 on one half ring which fit over corresponding ears in the other half ring and are united together by a drop-in pin 50. The ring 46 has two vertical webs 51, 52 which form cords extending across its parallel to one another and it is provided with feet 53 to space it from the ground. The distance apart of the webs 51, 52 is sufficient to admit the tyre of an aircraft undercarriage wheel between them, as is indicated by the chain line 54 in Figure 1 and the outline in chain lines of the wheel 54 in Figures 2 and 3. It will be understood that by lifting out the pin 50 the two sides of the ring 47 can be hinged apart and placed on either side of the wheel 54 after which they can be closed together again and the pin 50 dropped in place. If thereafter the trolley is manoeuvred toward the ring 46 with the gripper ring 42, 43 open as shown in chain lines in Figure 1 of the truck, the two halves of the gripper ring can be brought into position outside the inner ring 46 and then closed upon it into the position shown in full lines in Figure 1. The pivots 40 permits the outer ring 42, 43 to be brought into the horizontal position where it fits on the inner ring 46 notwithstanding any tilting of the arms 32.

Figure 4:
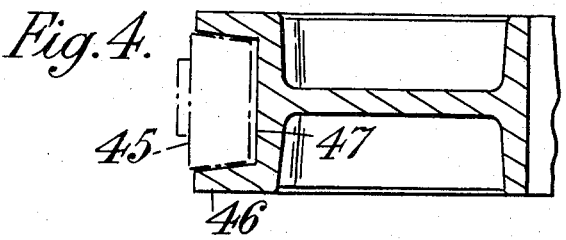
Figure 4 is a section, upon the line 4—4 of Figure 3, looking in the direction of the arrows.
Figure 5:
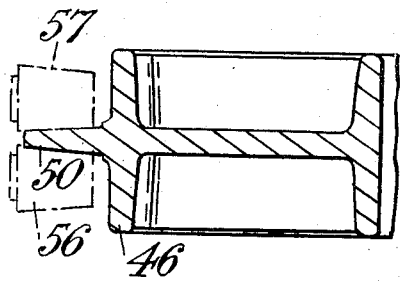
Figure 5 is a section of an alternative form of ring.

With the parts thus positioned, if the arms 25 of the cylinders 24 are retracted, the inclinable block 26 and with it the gripper arms 32 which it carries can be raised, lifting with them the wheel 54 so that it is clear of the ground. Thereafter the aircraft can be manoeuvred into any position desired by operating the motor 16 and steering by means of the tiller 17. Figure 4 shows a section of the ring 46 of Figure 3 with the conical roller 45 indicated in chain lines and it will be observed that the effect of the rollers 45 is to prevent the ring 46 from moving either upward or downward relatively to the outer ring 42, 43, once the latter is properly engaged with the channel 47 in the rim of the ring 46.

As an alternative the ring 46 may have its rim formed with a single central flange 50 and the outer gripper ring 42, 43 will in that case be provided with pairs of conical rollers 56, 57 arranged to engage both the upper and the under faces of the flange 50. The result would be the same.

Alternatively again, instead of conical rollers there may be employed rollers having spherical surfaces, and the surfaces of the flange or flanges on the ring may be of annular shape, that is to say hollowed so as to fit the spherical roller surfaces. It is advisable to have rollers to engage the flange so that friction is reduced to a minimum, but any other anti-fricion form of engaging member might be employed.

It will be noted that if any means is provided on the ring 46 to hold the wheel 54 down in the ring, with the construction according to the present invention the aircraft wheel is incapable of becoming detached from the trolley by a momentary or accidental lifting effect, such as might occur on an aircraft carrier due to wind or to rolling of the carrier.

I claim:

1. Apparatus for maneuvering an aircraft on the ground comprising in combination a trolley having a low chassis, a steering and driving wheel on the rear end of the chassis, lateral ground wheels at the forward end thereof, gripper arms supported from the chassis and located between said ground wheels, and wheel engaging ring adapted for coaction with a wheel of the aircraft and having at least one circumferential bearing flange thereon, means on the trolley to lift the gripper arms relatively to the trolley wheels and engaging means on the gripper arms coacting with said bearing flange preventing upward movement thereof relatively to said gripper arms.

2. The apparatus of claim 1 wherein the gripper arms are mounted so that they project forwardly from a tiltable bracket and means are provided to tilt the bracket to lift the gripper arms at their gripping end.

3. The apparatus of claim 2 wherein said engaging means permit the ring to tip about an axis transverse to the length of the trolley so that when the gripper arms are lifted the aircraft-wheel-engaging ring can remain substantially level.

4. The apparatus of claim 1 wherein said wheel engaging ring is provided with two external flanges forming a channel therebetween, and said engaging means is adapted to coact with said channel.

5. The apparatus of claim 4 wherein said engaging means includes a plurality of rollers.

6. Apparatus for maneuvering an aircraft on the ground comprising in combination a trolley having a low chassis, a steering and driving wheel on the rear end of the chassis, lateral ground wheels at the forward end thereof, gripper arms supported from the chassis and located between said ground wheels, a wheel engaging ring adapted for coaction with a wheel of the aircraft and having at least one circumferential bearing flange thereon, means on the trolley to lift the gripper arms relatively to the trolley wheels and engaging means on the gripper arms to coact with said bearing flange, said engaging means comprising a split outer ring having on its inner surface anti-friction bearing members to engage the wheel engaging ring, the two halves of the split ring being attached, one to one of the gripper arms and the other to the other gripper arm.

References Cited in the file of this patent
UNITED STATES PATENTS

| | | |
|---|---|---|
| 2,287,955 | Zunino | June 30, 1942 |
| 2,732,088 | Arnot | Jan. 24, 1956 |